United States Patent [19]

Leowald

[11] 4,063,145
[45] Dec. 13, 1977

[54] CIRCUIT ARRANGEMENT FOR FIRING CONTROLLED, PARALLEL-CONNECTED ELECTRIC VALVES

[75] Inventor: Karl-Friedrich Leowald, Erlangen, Germany

[73] Assignee: Siemens Aktiengesellschaft, Berlin and Munich, Germany

[21] Appl. No.: 683,688

[22] Filed: May 6, 1976

[30] Foreign Application Priority Data

May 13, 1975 Germany .............................. 2521262
Mar. 24, 1976 Germany .............................. 2612549

[51] Int. Cl.² ............................................. H02M 1/08
[52] U.S. Cl. .................................... 363/71; 307/252 L
[58] Field of Search ................ 307/252 L; 321/27 R, 321/27 MS; 323/23, 25

[56] References Cited

U.S. PATENT DOCUMENTS

| | | | |
|---|---|---|---|
| 2,572,648 | 10/1951 | Mittag | 321/27 R |
| 3,218,476 | 11/1965 | Hansson | 307/252 L |
| 3,670,236 | 6/1972 | Ekstrom | 321/27 R |
| 3,904,950 | 9/1975 | Judd et al. | 321/27 R |
| 3,913,000 | 10/1975 | Cardwell | 321/27 R |
| 3,938,026 | 2/1976 | Hoffmann et al. | 307/252 L |
| 3,986,103 | 10/1976 | Frankenberg et al. | 321/27 R |

Primary Examiner—A. D. Pellinen
Attorney, Agent, or Firm—Kenyon & Kenyon, Reilly, Carr & Chapin

[57] ABSTRACT

Apparatus for firing the thyristors or valves in parallel connected first and second valve branches. More particularly, a firing device is provided for providing firing pulses to at least a first valve in the first valve branch. A refining device is provided which includes a transformer for determining the difference in the current carried by the first valve and a second valve adjacent thereto in the second valve branch. The latter firing device also comprises a threshold member which, when the current difference determined by the transformer exceeds a predetermined value, causes the one of the first and second valves carrying the lesser current to receive firing pulses.

6 Claims, 6 Drawing Figures

CIRCUIT ARRANGEMENT FOR FIRING CONTROLLED, PARALLEL-CONNECTED ELECTRIC VALVES

BACKGROUND OF THE INVENTION

1. Field of the Invention

The invention relates to a circuit arrangement for firing controlled, parallel-connected electric valves and, in particular, a circuit arrangement in which a control device for generating firing pulses is connected to the control path of at least one of two adjacent valves.

2. Description of the Prior Art

In firing parallel-connected electric valves, the problem of uniform division of the current arises. Typically, to obtain a uniform division of the current, selected valves from a suitably defined forward voltage group are employed. However, even when such valves are used, there a further problem arises. Immediately after firing the forward voltage across each valve may deviate to a larger or smaller degree from the defined static characteristic, due to the inductive behavior of the p-n junction. Thus, after firing, the total current divides over the parallel-connected valves according to their static characteristics only after a certain time has elapsed and a given current value has been reached. It is, therefore, typical to maintain the firing pulses for all valves for a time which is long enough to ensure that a uniform division of the total current is realized. For example, for currents over 300 A, such as might occur in converters for high-voltage d-c power systems (HGUe systems), firing pulses of 500 usec. duration may be employed. For currents below 300 A, firing pulses of a substantially longer duration in the area of 6 msec may instead be employed.

It is a primary object of the present invention to provide an apparatus for firing parallel-connected valves which is substantially immune to interference, employs a minimum of circuitry, and consumes little firing energy.

SUMMARY OF THE INVENTION

The above and othe objectives are accomplished in accordance with the principles of the present invention in an apparatus which includes a refiring device which is connected to the control path of at least one of two adjacent valves of the parallel-connected valve branches being fired. More particularly, the refiring device includes a threshold member or comparator member which is responsive to the difference in the load currents carried by the adjacent valves and which causes the valve carrying the smaller load current to receive firing pulses, if the difference of the load currents exceeds a predetermined amount. The apparatus further includes a transformer arrangement connected to the refiring device for providing thereto a signal corresponding to the difference in the load currents carried by the adjacent valves. As can be appreciated, if an uneven current division occurs between parallel-connected valves, a current difference occurs between the partial load currents carried by the valves. In the present apparatus, if this current difference exceeds a predetermined value, a firing pulse is delivered to that valve which carries the smaller partial load current or no current at all. This valve is addressed by firing pulses until it receives a sufficient degree of additional current to cause a uniform division of the current between the two valves.

The present apparatus has the advantage that pulses of short duration can now be used to fire valves which are conected in parallel via lines with very low impedance. Thus, for example, with the present apparatus firing pulses with a duration of less than 50 usec may be used. The pulse duration can, therefore, be selected so that the required holding current of the valves is just exceeded.

Using short duration pulses for the firing of parallel-connected valves enables both valves to participate in the conduction of the current upward from a given value of the total current. A current division according to the static forward characteristics of the valves is thereby achieved. In particular, if the current is extinguished in one valve, due to a current oscillation superimposed on the total current, the extinguished valve is fired again automatically. It is, therefore, not necessary to monitor all valve currents and to transmit firing pulses to all valves from an auxiliary energy source as a precautionary measure.

In the case of parallel-connected valves, it is common practice to connect the control paths of all valves to a firing control device for generating firing pulses. In a further embodiment of the apparatus of the invention the control paths of all valves of the parallel-connected valve branches are connected to a firing control device via decoupling diodes and are also connected to refiring devices via a further set of decoupling diodes. If one of the valves is not fired or does not participate in the conduction of the current to a sufficient degree, or if one of the valves is extinguished during its current-conduction period, this valve is addressed through its respective refiring device by firing pulses, until it participates in the conduction of the current to a sufficient degree.

In a further embodiment of the invention, the control paths of only one valve of the parallel-connected valves is connected with a firing control device for generating firing pulses, while the other parallel-connected valve is connected with a refiring device. In this embodiment, therefore, only the one valve is itself fired by the firing control device proper. Therefore, current flows initially only in this one valve. The current difference produced in the valves is then detected by the apparatus of the invention and causes firing pulses to be given to the parallel-connected valve that has not been fired. This valve is then fired.

In the embodiments of the apparatus, the magnitude of the predetermined amount of the current difference to be exceeded before firing pulses are to be delivered to a parallel-connected valve carrying a smaller load current, is important. This amount of current difference is chosen larger than the displacement current which can occur at the valve for the steepest voltage slope due to the anode-cathode circuit and taking into consideration the junction capacity of the thyristors. The predetermined amount of the current difference is chosen smaller, however, than the rated current of the individual valve. With such a design of the predetermined amount of the current difference, unpermissible switching-on of the valve in the event of pulse voltage stress, as well as overloading of a valve by excessive currents, is avoided.

The apparatus of the invention can also be used in converters in which the electric valves are assembled with their heat sinks to form so-called "columns". In each column, several valves are connected in series. The columns are connected in parallel in order to permit a larger total current. The cathodes and anodes of the valves are connected with each other via cross leads. In such a converter arrangement, the cathode current of the individual valves can no longer be measured directly. The apparatus of the invention can be adapted for use in such a converter by monitoring the current in the cross leads via a transformer and by providing refiring devices for firing the valves whose current contributions to their respective cross leads is below a predetermined valve. In this manner division of the current to the individual valves in accordance with their static forward characteristics can be achieved.

A modification of the above embodiment of the invention provides that the control paths of every second valve of each column are alternatingly connected with a firing control device, while the control paths of the remaining valves are connected with refiring devices which are controlled by current transformer arrangements in the cross lead.

A further advantageous embodiment of the invention for firing controlled electric valves in parallel-connected valve branches, in which adjacent valves are connected with each other via cross leads, provides that for two adjacent valves, one refiring device is provided which is connected to the secondary winding of a current transformer, the primary winding of which is connected into the cross lead connecting the valves. In this embodiment, the refiring device for each pair of adjacent valves includes a rectifier bridge circuit having its a-c inputs connected to the ends of the secondary winding of the current transformer and to control electrode of one of the adjacent valves. The refiring device additionally includes a series connection of a Zener diode and an ohmic resistor connected across the d-c outputs of the bridge. A threshold member is connected at one of its ends to the junction point of the Zener diode and ohmic resistor and at its other end to the control input of an amplifier, the load circuit of which is likewise connected to the junction point between the Zener diode and the ohmic resistor.

SUMMARY OF THE DRAWINGS

The above and other features and aspects of the present invention will become apparent upon reading the following detailed description in conjunction with the accompanying drawings, in which.

DETAILED DESCRIPTION

Figure 1:
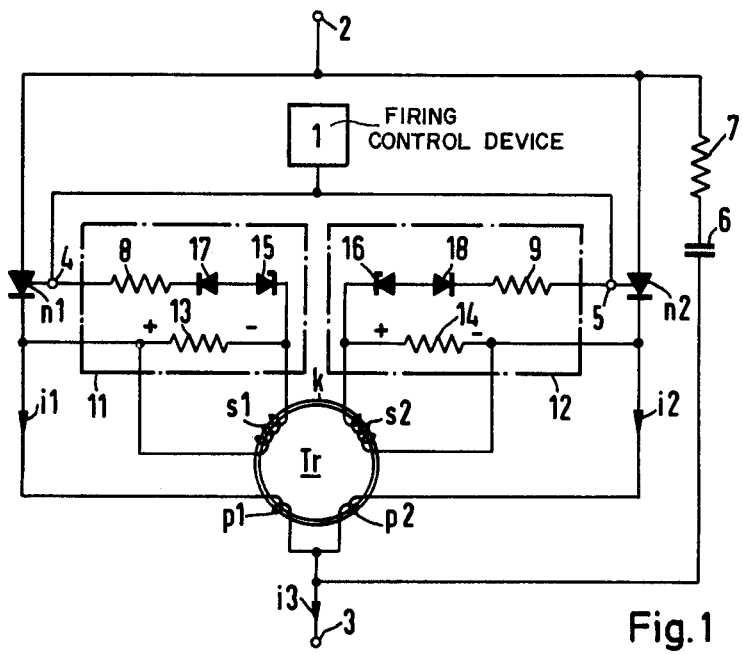
FIG. 1 shows an apparatus in accordance with the invention for firing two controlled, parallel-connected electric valves.

FIG. 1 shows a first embodiment of the present invention in which two thyristors $n1$ and $n2$, shown as controlled electric valves, are connected in parallel between two terminals 2 and 3. The thyristors $n1$ and $n2$ carry partial load currents $i1$ and $i2$ which together form a total current $i3$. The control paths 4 and 5 of the two thyristors $n1$ and $n2$ are connected with a firing control device 1. The latter device generates firing pulses, preferably of short duration, and delivers them simultaneously to the control paths of both thyristors. The load circuits of both thyristors are connected to a current transformer Tr which has two primary windings $p1$, and $p2$ and two secondary windings $s1$, $s2$. As indicated, the primary winding $p1$ carries the partial load current $i1$ and the primary winding $p2$ the partial load current $i2$. The two partial load currents $i1$ and $i2$ induce fields of opposite directions in the magnetic core $k$ of the transformer. If both partial currents $i1$ and $i2$ are equal, the fields induced cancel and no currents are generated in the secondary windings. If, on the other hand, the partial load currents are different, the induced fields do not cancel and currents are generated in the latter windings. These induced currents are fed to the refiring devices 11 and 12, respectively.

The refiring device 11 includes a load resistor 13, which is connected with the secondary winding $s1$, as well as a threshold diode 15, a diode 17 and a series resistor 8. The refiring device 12, is similarly constructed and includes a load resistor 14, a threshold diode 16, a didode 18 and a series resistor 9. The outputs of the refiring devices 11 and 12 are connected to the control paths 4 and 5 of the two thyristors $n1$ and $n2$, respectively, for exercising control thereover.

To explain the operation of the apparatus of FIG. 1, it will be assumed that the control paths of both thyristors are addressed simultaneously by the firing control device 1 with firing pulses, but that the thyristor $n2$ is not brought thereby into conduction. The partial load current $i2$ is, therefore, initially zero. The partial current $i1$, on the other hand, is not zero and, therefore, induces a field in the magnetic core k of the current transformer Tr. The induced field causes currents to flow in the secondary windings $s1$ and $s2$ and through the load resistors 13 and 14 with the polarities indicated.

If the partial load current $i1$ of the thyristor $n1$ has reached a value which, taking into consideration the transformation ratio of the current transformer Tr, results in an induced current in the resistor 14 of sufficient value to produce a voltage drop thereacross which exceeds the breakthrough voltage of the threshold diode 16, then a firing current flows to the control path 5 of the thyristor $n2$. The breakthrough voltage of the threshold diode 16 is chosen so that the partial load current $i_1$ required to produce a secondary voltage (voltage drop across resistor 14) corresponding thereto is larger than the displacement current for the maximum voltage slope at the thyristor $n1$ due to the anodecathode circuit comprising the capacitor 6 and the resistor 7 and taking into consideration the junction capacity of the thyristor. However, the voltage of the threshold diode 16 is further selected so that the load current $i_1$ required to produce a corresponding secondary voltage is less than the nominal rated current of the thyristor $n1$. Such selection of the breakthrough voltage prevents an unpermissible delivery of firing pulses in the event of a pulse voltage stress as well as prevents overloading of the thyristor $n1$ by excessive currents.

The current transformer Tr may advantageously be constructed from a magnetic core $k$ which, preferably, is a ring core, and which carries the two primary windings $p1$ and $p2$ as well as the two secondary windings $s1$ and $s2$. Also, the ratio of the number of turns of the transformer is preferably selected to be large and may, for example be, 100:1.

Figure 2:
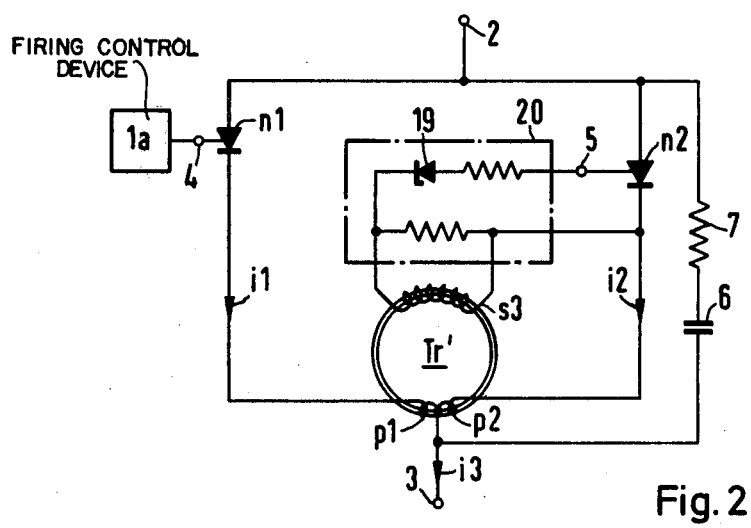
FIG. 2 shows a second embodiment of the apparatus of the invention.

FIG. 2 shows a second embodiment of the invention in which components which are the same as or equivalent to those in FIG. 1 have been similarly numbered. This embodiment comprises a simpler circuit as that of FIG. 1 and is based on the fact that the apparatus of that invention ensures that for a pair of parallel-connected thyristors n1 and n2 the second thyristor is always refired if the first thyristor carries current. Thus, as shown, in this embodiment, only the control path 4 of the thyrister n1 is connected with the firing control device 1a. The thyristor n2 in turn, is refired by the refiring device 20, if the voltage induced in the secondary winding s3 of the current transformer Tr' by the partial load current i1 exceeds the breakthrough voltage of the threshold diode 19. The firing of both thyristors n1 and n2, therefore, requires that the firing control device 1a only supply firing energy to the thyristor n1. The firing energy for the thyristor n2 is derived from the partial load current of the thyristor n1. As a result, a large amount of firing energy can be made available for the thyristor n2.

It should be noted with respect to the embodiment of FIG. 2, that the thyristor n1 is not refired in the event of an unintended extinction of that thyristor, for example, due to a current oscillation superimposed on the total current. If this type of disturbance is to be avoided, the circuit of FIG. 2 can be modified by providing a further refirng device for the thyristor n2 in the manner shown in FIG. 1 .

Figure 3:
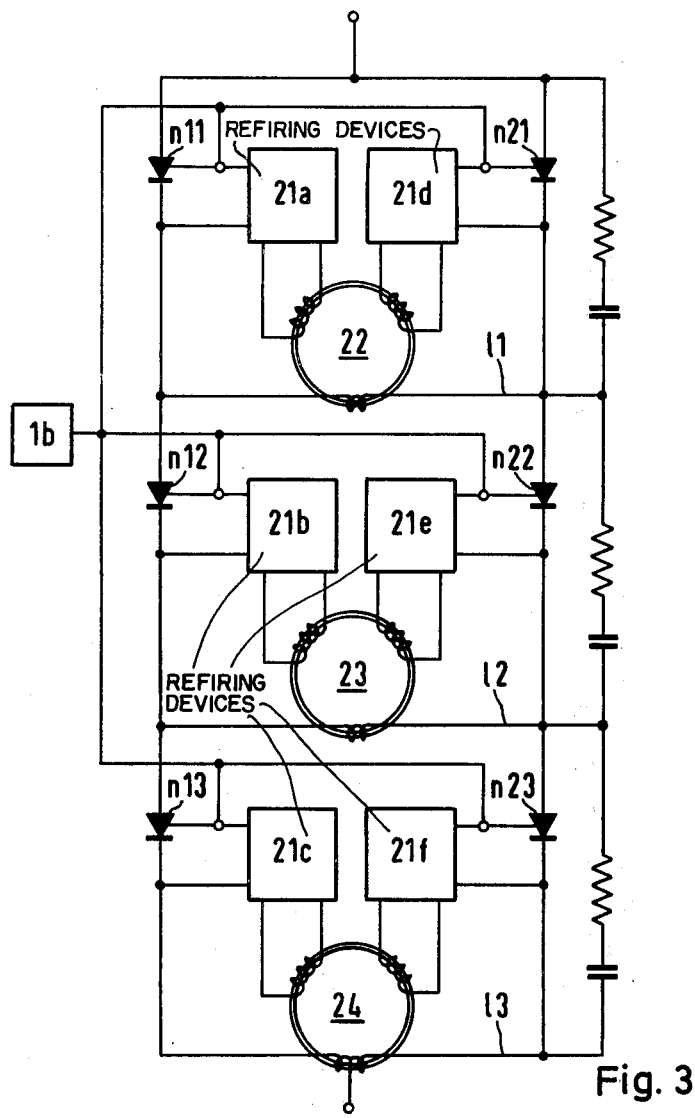
FIG. 3 illustrates use of the apparatus of the invention to fire the valves in two parallel-connected columns of valves of a converter.

FIG. 3 shows the use of the apparatus of the present invention in a section of a converter which comprises two valve branches connected in parallel. As shown, each valve branch includes three serially connected thyristors, the thyristors in the left branch being designed as n11, n12 and n13 and those in the right branch as n21, n22 and n23. Usually, the thyristors in the two branches, with their heat sinks, are clamped together in columns. As shown, the anodes and cathodes of the respective adjacent thyristors in both columns are connected with each other by cross leads 11, 12, and 13.

Connected to the control electrodes of the respective six valves, n11 to n23, are the refiring devices 21a to 21f. These devices may be designed in a similar manner as already described for the refiring devices in the previous embodiments. A control device 1b is connected to the control paths of all valves for simultaneously feeding the valves firing pulses. The refiring devices, e.g., 21a, 21d feeding adjacent pairs of valves of the two branches, e.g., n11, n21, have their inputs connected to the same current transformer,e.g., transform 22, for picking up the cross current in the cross leads, e.g., l1, connecting their respective thyristors with the correct sign. In principle, the three current transformers 22, 23, 24 associated with the pairs of refiring devices 21a, 21d; 21b, 21e; and 21c, 21f can be designed similarly to the refiring devices in FIGS. 1 and 2.

As can be appreciated, as soon as the cross current in a cross lead exceeds a predetermined value, the control path of the valve associated with the lead and carrying the smaller current is addressed by firing pulses. Which of the two adjacent valves associated with a particular cross lead carries no or too little current can be derived from the direction of the cross current.

Figure 4:
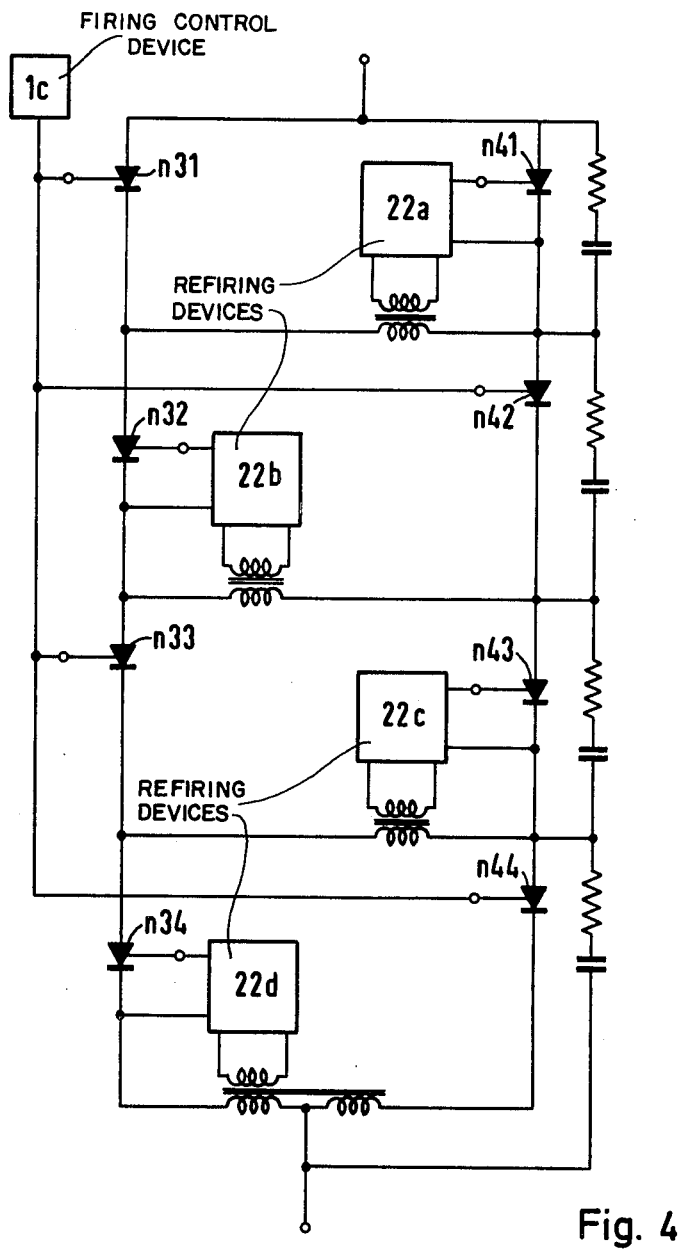
FIG. 4 shows a modification of the apparatus of FIG. 3.

FIG. 4 shows another embodiment of the present invention for use with two parallel-connected valve branches, in which the valves n31 to n34 of one branch and the valves n41 to n44 of the other branch are connected in series. This embodiment is based on the feature that a non current-carrying valve is refired, if its adjacent valve in the other valve branch carries current. As a result, in this case only the control paths of every second valve n31, n42, n33, n44 in the individual valve branches are connected alternatingly with a firing control device 1c. The other devices are controlled by the cross currents in the cross leads connecting their associated adjacent valves. Since in this embodiment, only every second valve need be supplied with firing control device 1c, only one-half the amount of firing energy is required.

It should be noted that it is also possible to provide each of the valves of FIG. 4 with a refiring device. In such case, an embodiment similar to the embodiment shown in FIG. 3 is obtained, except that only every second valve is alternatingly connected with the firing control device.

Figure 5:
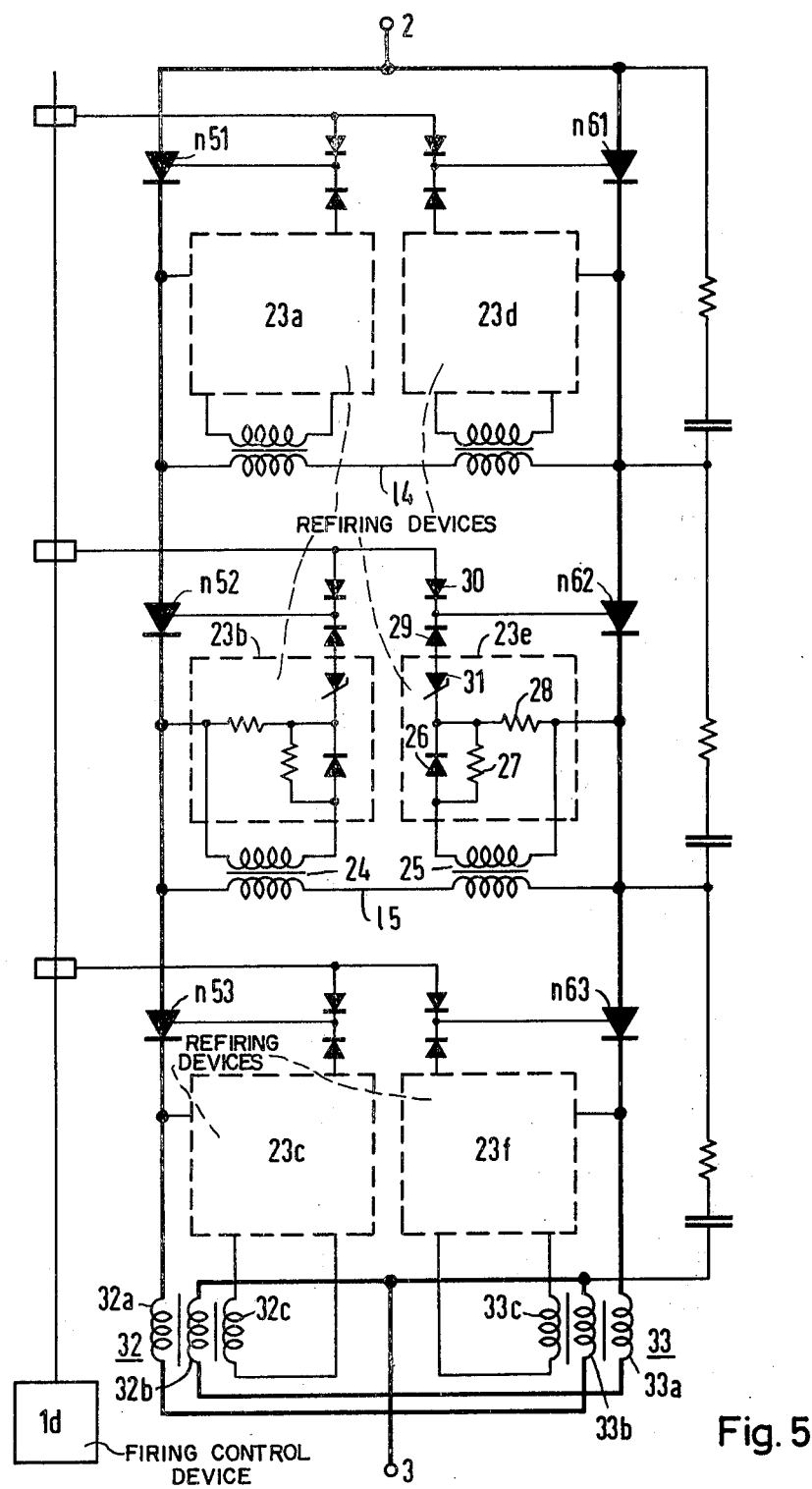
FIGS. 5 and 6 illustrate other embodiments of apparatus in accordance with the principles of the invention.

FIG.5 shows another embodiment of an apparatus in accordance with the invention. As shown, the apparatus includes a first set of series-connected thyristors n51, n52, n53 and likewise a second set of series-connected thryristors n61, n62, n63 all of which have their control paths connected to a firing control device 1d. The firing control device 1d, for example, generates firing signals in the form of light pulses or high-frequency pulses, which are coupled through a light guide or a waveguide and are converted in converters into electrical firing signals for the thyristors. The two sets of series-connected thyristors n51 to n53 and n61 to n63, with which , if desired, a further number of thyristors may be connected in series, are connected in parallel between the input terminal 2 and the output terminal 3 of a converter branch. Adjacent thyristors of the two upper pairs of thyristors are connected with each other via cross leads 14 and 15, respectively. Associated with each thyristor, is one of the similarly configured refiring devices 23a to 23f. The design and operation of the aforesaid refiring devices will be explained by making reference to the refiring device 23e as an example.

More particularly, as shown, two current transformers 24 and 25 are arranged in the cross lead 15 between between the adjacent thyristors n52 and n62. The latter two current transformers may be commercially available bushing transformers, which comprise an iron core with a secondary winding. A bus bar placed through the core serves as the primary winding. The direction of the primary windings determines the assignment of the connected refiring devices to the respective thyristors.

The refiring device 23e connected to the secondary winding of the current transformer 25 contains a diode 26 connected in series with a resistor 28. The diode 26 is shunted by a further resistor 27. The junction point between the diode 26 and the resistor 28 is connected via a Zener diode 31 serving as a threshold device and a decoupling diode 29 to the control electrode of the thyristor n62. The control electrode of the thyristor n62 is also in effective connection with the firing control device 1d via a further decoupling diode 30.

As long as the load currents of the two adjacent thyristors n52 and n62 are approximately equal and the current in the cross lead 15 is small, the current induced in the secondary winding of the current transformer 25 flows via the diode 26 and the resistor 28. If, however, for example, the thyristor n62 is not fired or is extinguished, then a very large current is produced in the cross lead 15, which induces a correspondingly large secondary current in the secondary winding of the current transformer 25. Such current, in turn, causes the voltage drop at the resistor 28 to exceed the Zener voltage of the Zener diode 31. As a result, the thyristor n62 is refired via the decoupling diode 29.

In order for the iron core of the current transformer 25 to become remagnetized as fast as possible, a current path from the secondary winding via the two resistors 27 and 28 is provided for the remagnetization current flowing in the reverse direction. The transformer core is, therefore, safely remagnetized to the remanence point in the current-free intervals between the current-conduction periods of the thyristors.

In FIG. 5, the two refiring devices 23c and 23f serving the adjacent thyristors n53 and n63 which are connected to the common output terminal 3, have their inputs connected, respectively, to the secondary winding 32c of a current transformer 32 and to the secondary winding 33c of a current transformer 33. Each of the current transformers 32 and 33 has two primary windings and one secondary winding on a single core. More particularly, the primary windings are connected in such a way that the thyristor n53 is connected via the primary winding 32a of the current transformer 32 and the primary winding 33b of the current transformer 33 to the output terminal 3, while the thyristor n63 is connected via the primary winding 33a of the current transformer 33 an the primary winding 32b of the current transformer 32 likewise to the output terminal 3. If simple bushing transformers are to be employed for the current transformers 32 and 33, the two bus bars from the thyristors n53 and n63, respectively, can serve as primary windings by placement through their respective transformer cores in opposite current flow directions.

Figure 6:
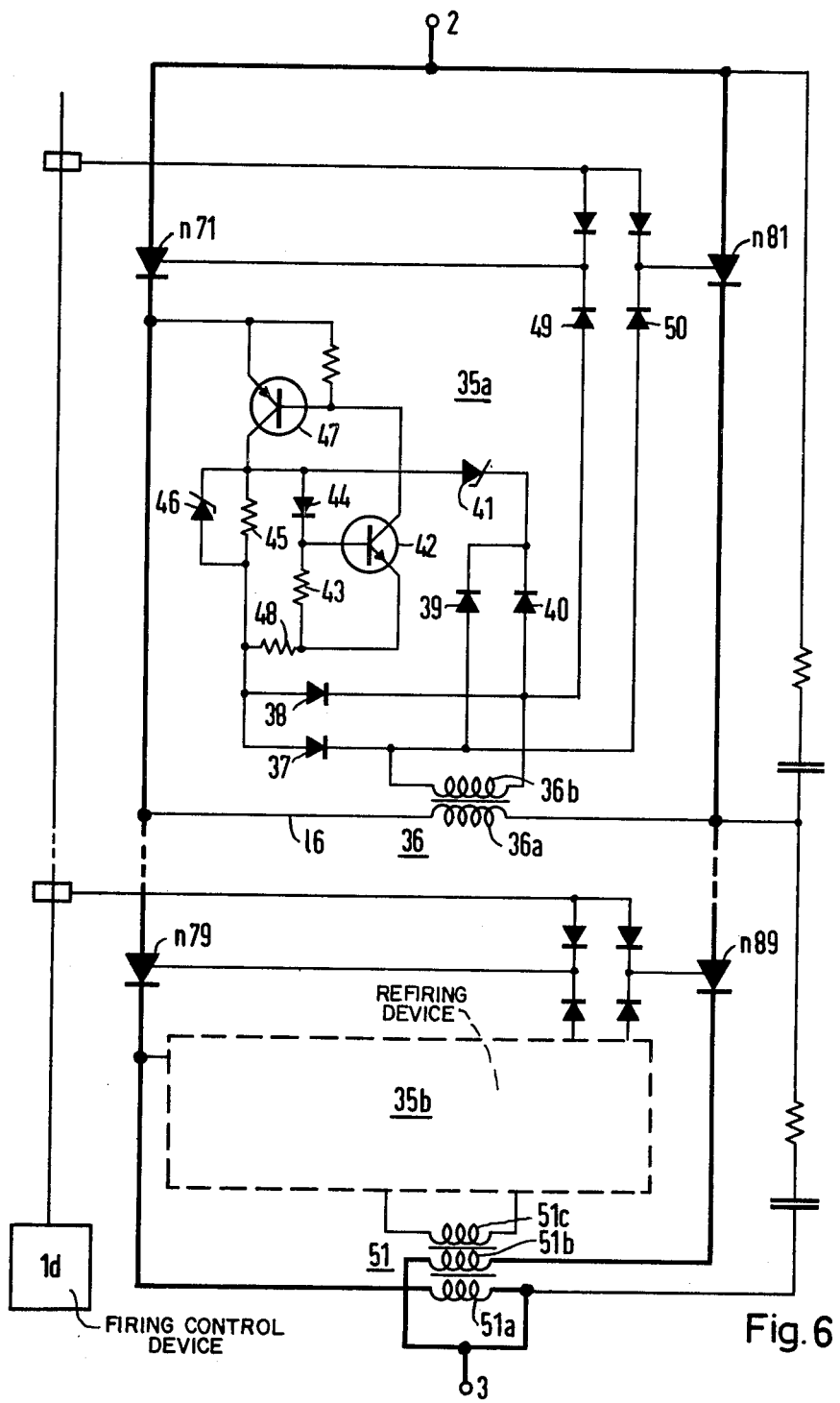

FIG. 6 shows a section of a converter branch between the input terminal 2 and the output terminal 3 of which are connected in parallel two branches of series-connected thyristors. In FIG. 6, only the two thyristors n71 and n81 of the branches closest to the input terminal 2 and the two thyristors n79 and n89 of the branches closest to the output terminal 3 are specifically shown. Each of the branches in actual practice may have a large number of thyristors, e.g., 100 thyristors, connected in series between the aforesaid two of its thyristors.

The two thyristors n71 and n81 are connected to each other via a cross lead 16, in which a current transformer 36 having a primary winding 36a is arranged. The transformer 36 may also be a simple bushing transformer. In such case, the cross lead 16 may serve as the primary winding of the transformer by inserting it through the iron core of the transformer which carries the secondary winding thereof. As can be appreciated, whether the refiring device 35a refires the thryistor n71 or the thyristor n81 depends upon the direction of current flow in the primary winding and, therefore, in the secondary winding of transformer 36.

As shown, the refiring device 35a contains a rectifier bridge which includes diodes 37, 38, 39, and 40. The rectifier bridge is fed the output of the secondary winding 36b of a current transformer 36. The outputs of the rectifier bridge are connected to each other via a Zener diode 41 connected in series with a resistor 45. The resistor 45 is shunted by another Zener diode 46 for voltage limiting. The resistor 45 is also shunted by the series-connection of two resistors 43 and 48 and a threshold diode 44. The junction point between the threshold diode 44 and the resistor 43 is connected to the base of a transistor 42. The load circuit of the transistor 42 is connected with the base of a further transistor 47, the load circuit of which is connected between the junction point between the Zener diode 41 and the resistor 45 on the one side and the cathode of the thyristor n71 on the other side.

As long as the load currents of the adjacent thyristors n71 and n81 are approximately equal and, therefore, the cross current in the cross lead 16 is small, the secondary current induced in the current transformer 36 flows via the diodes 37 to 40 of the rectifier bridge, the Zener diode 41 and the resistor 45. If, however, the thyristor n81, for example, was not fired or if the thyristor n81 is extinguished, then a very large cross current flows through the cross lead 16, thereby causing a commensurate increase in the rectified secondary current. The diodes 38 and 39, thus become flooded. As soon as the voltage drop across the resistor 45 exceeds the threshold voltage of the diode 44 and the base-emitter threshold voltage of the transistor 42, the transistor 42 starts to conduct and, in turn, switches the transistor 47 into conduction. Current is therefore, caused to flow via the transistor 47, the resistor 45 and the diode 37. This current drives the control electrode of the thyristor n81 via the decoupling diode 50 and the latter thyristor n81 is, therefore, refired.

If, on the other hand, the thyristor n71 was not fired or is extinguished, then the cross current in the cross lead 16 flows in the opposite direction, thereby resulting in a rectified secondary current which causes the diodes 37 and 40 in the rectifier bridge to become flooded. Current now flows via the transistor 47, the resistor 45, the diode 38 and the decoupling diode 49 to the control electrode of the thyristor n71, and the thyristor n71 is refired.

In the refiring device 35a, the threshold diode 44 in conjunction with the base-emitter junction of the transistor 42 serve as a threshold member. In lieu of the threshold diode 44, a Zener diode poled in the reverse current-flow direction can also be employed. Moreover, the required voltage may be provided solely by the base-emitter threshold voltage of the base emitter junction of the transistor 42.

The two thyristors n79 and n89 connected to the common output terminal 3 both have their control paths coupled to a refiring device 35b, of similar design as the refiring device 35a. As shown, the refiring device 35b has its input connected to a current transformer 51. The latter transformer has a common iron core upon which is wound two primary windings 51a and 51b, as well as a secondary winding 51c. The load currents flow through the two primary windings 51a and 51b in opposite directions. A simple busing transformer can once again be used for transformer 51, the two bus bars through which currents flow in opposite directions being inserted through the core of the transformer.

In the above-described apparatus embodiments of the present invention, it is advantageously that current fluctuations and displacement currents in the converters do not affect the refiring devices, as long as the current difference between the valve currents of adjacent valves does not exceed a predetermined amount. Between the power circuits and the refiring devices, there is a potential separation as a result of the current transformers. Through a suitable transformation ratio of each current transformer, the voltage effective at the primary winding of the transformer can be kept very low, to obtain the usual grid voltages. As a result, the forward voltage across the overall series circuit, even of a very large number of valves, is not appreciably increased thereby.

Refiring devices of the apparatus of the invention can be employed in such a manner that the control paths of all valves of the parallel-connected valve branches are in effective connection with a firing control device via decoupling diodes and are connected with refiring devices via further decoupling diodes. The refiring devices in such case serve to ensure a uniform division of the current to the valves.

However, refiring devices of the apparatus of the invention can also be employed in such a manner that the control paths of one or two respective adjacent valves are in effective connection with a firing control device and that the control paths of at least the other valves are connected with refiring devices. In such case, only one of two respective adjacent vales is itself fired by the firing control device proper. Therefore, current flow is initially caused only in this valve. The current difference which occurs between the parallel-connected valves then releases, via the refiring device, firing pulses for the other valve. This valve is then refired.

What is claimed is:

1. Apparatus for firing controllable valves disposed in parallel connected first and second valve branches, said first valve branch including at least a first valve and said second valve branch including at least a second valve, said first valve being adjacent said second valve, connected thereto via a cross lead, and having a control path adapted to receive firing pulses from a firing device, the apparatus comprising:
    first means for determining the difference in load current carried by said first valve and by said second valve; said first means comprising a transformer arrangement; and
    second means responsive to said first means for generating firing pulses for application to one of said first and second valves when said one valve carries a lesser amount of current than the other valve of said first and second valves and when said current difference exceeds a predetermined value, said second means including:
    a series circuit comprising an ohmic resistor and a first diode;
    a threshold member connected at one end to the junction point between said ohmic resistor and said diode and at the other end to said control path of said one valve;
    means for connecting the secondary winding of said transformer across said series circuit; and
    means for connecting the primary winding of said transformer into said cross lead.

2. Apparatus in accordance with claim 1 in which: said threshold member is a Zener diode.

3. Apparatus in accordance with claim 1 in which said second means further includes:
    another resistor connected in shunt with said diode.

4. Apparatus in accordance with claim 1 in which: said second valve has a control path adapted to receive firing pulses from a firing device;
    said apparatus further includes for at least every other particular valve in said first and second valve branches:
    means for providing firing pulses to said particular valve when the load current carried by said valve is less than the load current carried by the adjacent valve in the other valve branch and the difference in the load currents carried by said particular valve and said adjacent valve exceeds a predetermined limit.

5. Apparatus for firing controllable valves disposed in parallel connected first and second valve branches, each including at least two valves connected in series, said first valve branch including a first valve which is adjacent to and connected via a cross lead with a second valve of said second valve branch, said first valve having a control path adapted to receive firing pulses from a firing device, the apparatus comprising:
    first means for determining the difference in load current carried by said first valve and said second valve, said first means comprising a transformer arrangement;
    second means responsive to said first means for generating firing pulses for application to one of said first and second valves when said one valve carries a lesser amount of current than the other valve of said first and second valves and when said current difference exceeds a predetermined value; said second means including:
    means for connecting the primary winding of said transformer into the cross lead connecting said first and second valves;
    an a-c bridge having inputs connected to the secondary winding of said current transformer and to the control path of said one valve and having outputs;
    a series circuit of a Zener diode and an ohmic resistor said series circuit being connected between said outputs of said bridge;
    a threshold member connected at one end to the junction point of said diode and said ohmic resistor;
    and an amplifier having a control input connected to the other end of said threshold member and a load circuit connected to said junction point.

6. Apparatus for firing controllable valves disposed in parallel connected first and second valve branches, said first valve branch including at least a first valve and said second valve branch including at least a second valve, said first valve being adjacent said second valve and connected thereto via a cross lead, and said first and second valves having control paths adapted to receive firing pulses from a firing device, the apparatus comprising:
    first means for determining the difference in load current carried by said first valve and by said second valve, said first means comprising a transformer arrangement which includes:
    first and second primary windings and first and second secondary windings;
    said first and second primary windings being responsive to the load currents carried by said first and second valves; and
    second means responsive to said first means for generating firing pulses for application to one of said first and second valves when said one valve carries a lesser amount of current than the other valve of said first and second valves and when said current difference exceeds a predetermined value, said second means including:
    a third means responsive to the signal from said first secondary winding for generating firing pulses for application to the control path of said one valve when said one valve carries load current which is less than the load current carried by said other valve and when said current difference exceeds a predetermining limit said third means including a decoupling diode connected to the control path of said one valve; and a fourth means responsive to the signal from said second secondary winding for generating firing pulses for application to the control path of said other valve when said other valve carries load current which is less than the load current carried by said one valve and said current difference exceeds said predetermined limit, said fourth means including a decoupling diode connected to the control path of said other valve;

and first and second decoupling diodes connected to the control paths of said first and second valves, respectively.

* * * * *